United States Patent [19]

Bickerton

[11] 4,191,488

[45] Mar. 4, 1980

[54] SECUREMENT ARRANGEMENT FOR BICYCLE BEARING ASSEMBLY

[75] Inventor: Harry Bickerton, Welwyn, England

[73] Assignee: Harry Bickerton Limited, Welwyn, England

[21] Appl. No.: 801,364

[22] Filed: May 27, 1977

[30] Foreign Application Priority Data

May 23, 1977 [GB] United Kingdom ............... 21703/77

[51] Int. Cl.² .......................... F16B 2/14; B62M 3/00
[52] U.S. Cl. ................................... 403/370; 74/594.1; 403/371
[58] Field of Search ................ 403/370, 371; 74/594.1

[56] References Cited

U.S. PATENT DOCUMENTS

| 1,120,410 | 12/1914 | Rohmer et al. | 403/370 X |
| 1,891,405 | 12/1932 | Bricksson | 403/370 X |
| 2,215,476 | 9/1940 | Peters | 29/526 X |
| 2,999,706 | 9/1961 | Wilcox | 403/370 |
| 3,182,986 | 5/1965 | Brockman | 403/370 X |
| 3,903,754 | 1/1975 | Morrni | 74/594.1 |

FOREIGN PATENT DOCUMENTS

| 1074339 | 1/1960 | Fed. Rep. of Germany | 403/370 |
| 58674 | 10/1953 | France | 74/594.1 |
| 23045 | of 1897 | United Kingdom | 74/594.1 |
| 10864 | of 1899 | United Kingdom | 74/594.1 |
| 146565 | 1/1977 | United Kingdom | |

Primary Examiner—Robert Mackey
Attorney, Agent, or Firm—Young & Thompson

[57] ABSTRACT

An arrangement is provided for securing together two hollow members of a framework of a bicycle, wherein one of the members passes through an aperture in the other. A pair of split collets surround the one member and extend into the aperture from opposite sides thereof. The one member has a tube secured to its outer surface in abutment with one of the collets, and this member is threaded and receives a nut which exerts pressure on the other collet. Tightening of the nut on the threaded member urges the collets into the aperture and secures the two members together. The one hollow member may have mounted therein bearings and a shaft of a pedal assembly of the bicycle.

4 Claims, 5 Drawing Figures

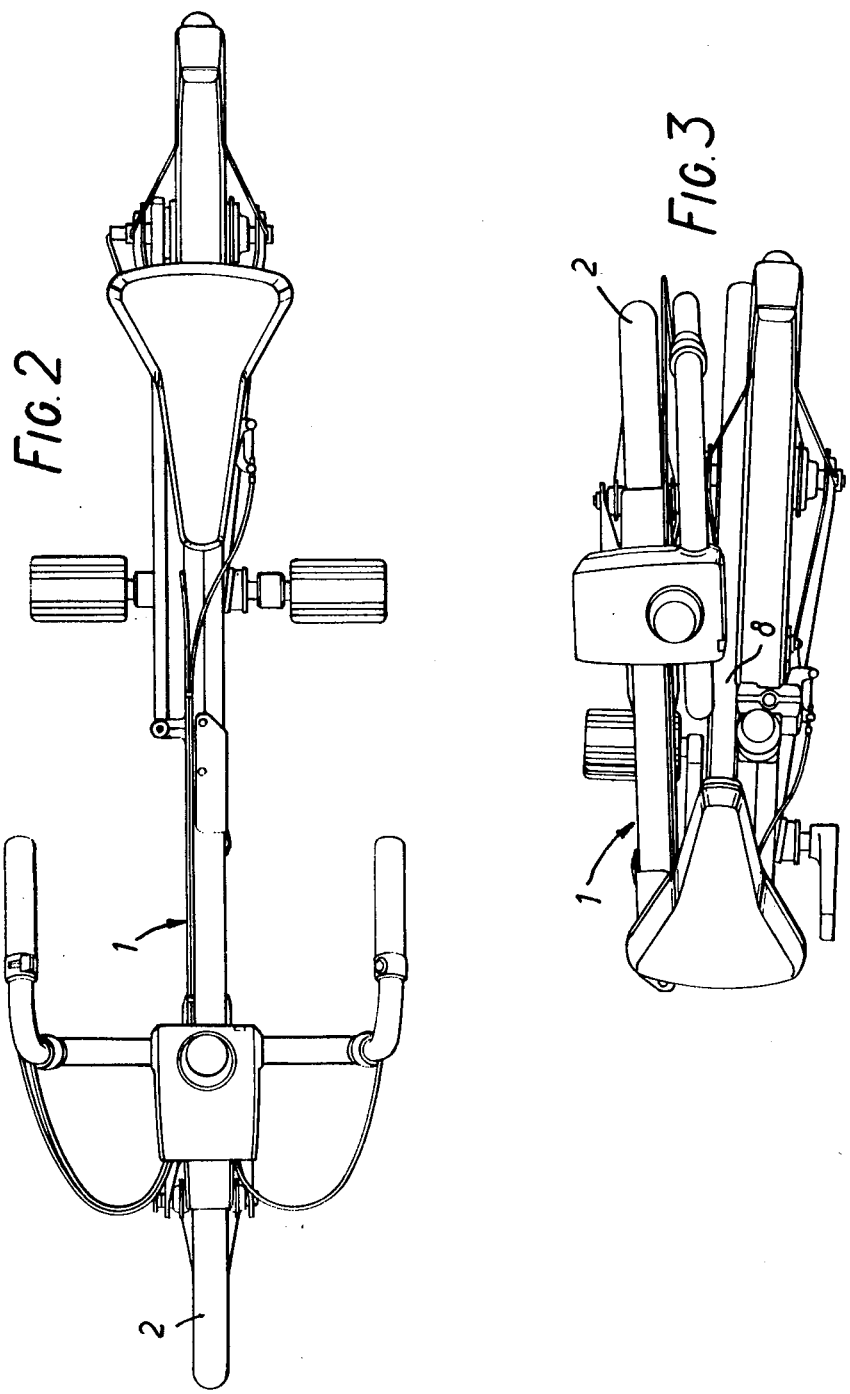

SECUREMENT ARRANGEMENT FOR BICYCLE BEARING ASSEMBLY

This invention relates to arrangements for effecting securement between two members, particularly, though not exclusively, between two members of a bicycle.

Where one member extends through an aperture in a second member and is secured thereto by clamping means, deterioration of the securement can occur, as by widening of the aperture, particularly where the two members experience repeated stress, as occurs in bicycles, and where the members are of material subject to fatigue such as the aluminium alloys used in lightweight and folding bicycles.

It is therefore an object of the present invention to provide a securement arrangement for a pair of members, one of which extends through an aperture in the other, whereby stress is minimized.

It is a further object of the invention to provide improved means for the mounting in a hollow bicycle frame member of a seat tube or a pedal shaft bearing assembly.

The invention thus provides a securement arrangement between two members, one of which extends through an aperture in the other, the arrangement having wedging means arranged to be engaged in the aperture between the members so as to resist relative movement thereof, and clamping means arranged to urge the wedging means into said engagement so as frictionally to secure the two members together. The arrangement of the invention may be provided, for example, between a tubular support member for the seat post or for the crankshaft bearing housing, and the main longitudinal frame member of the cycle.

The wedging means may comprise two wedging elements arranged to be urged towards each other into the aperture from opposite sides thereof. The or each wedging element can comprise a resiliently deformable collar or a split collet for location around the one member.

The clamping means conveniently comprises a flange or other abutment on the one member on one side of the aperture and a screw thread on the one member on the other side, together with a co-operatively tapped member engaged on the thread to effect clamping against the flange. Clamping can be effected in other ways as by swaging if preferred.

The two members may be hollow members. In this arrangement, the two wedging elements are disposed between the members in respective openings of the aperture in opposed wall portions of the other hollow member. The said one member may be tubular and the other member of box-section, for example; the flange-surface is conveniently provided by an end face of a tube that is resin-bonded to the tubular member.

The hollow member receiving the said one member may be provided with internal strengthening means adjacent its aperture, which may take the form of one or more members extending between the opposed wall portions having the openings therein.

The securement of the invention finds particular, though not exclusive, application in the assembly of tubular or other hollow members, and has particular advantages for use in bicycles, especially folding bicycles, by virtue of its simplicity in combination with the use of lightweight construction materials.

The invention also provides a method of effecting securement of two members.

Arrangements for effecting securement between two members of a folding bicycle in accordance with the present invention will now be described, by way of example, with reference to the accompanying drawings, in which:

FIGS. 1 and 2 are side and plan views, respectively, of the bicycle in its condition of use;

FIG. 3 is a plan view, corresponding to FIG. 2, of the bicycle when folded for storage or transport;

Figure 1:
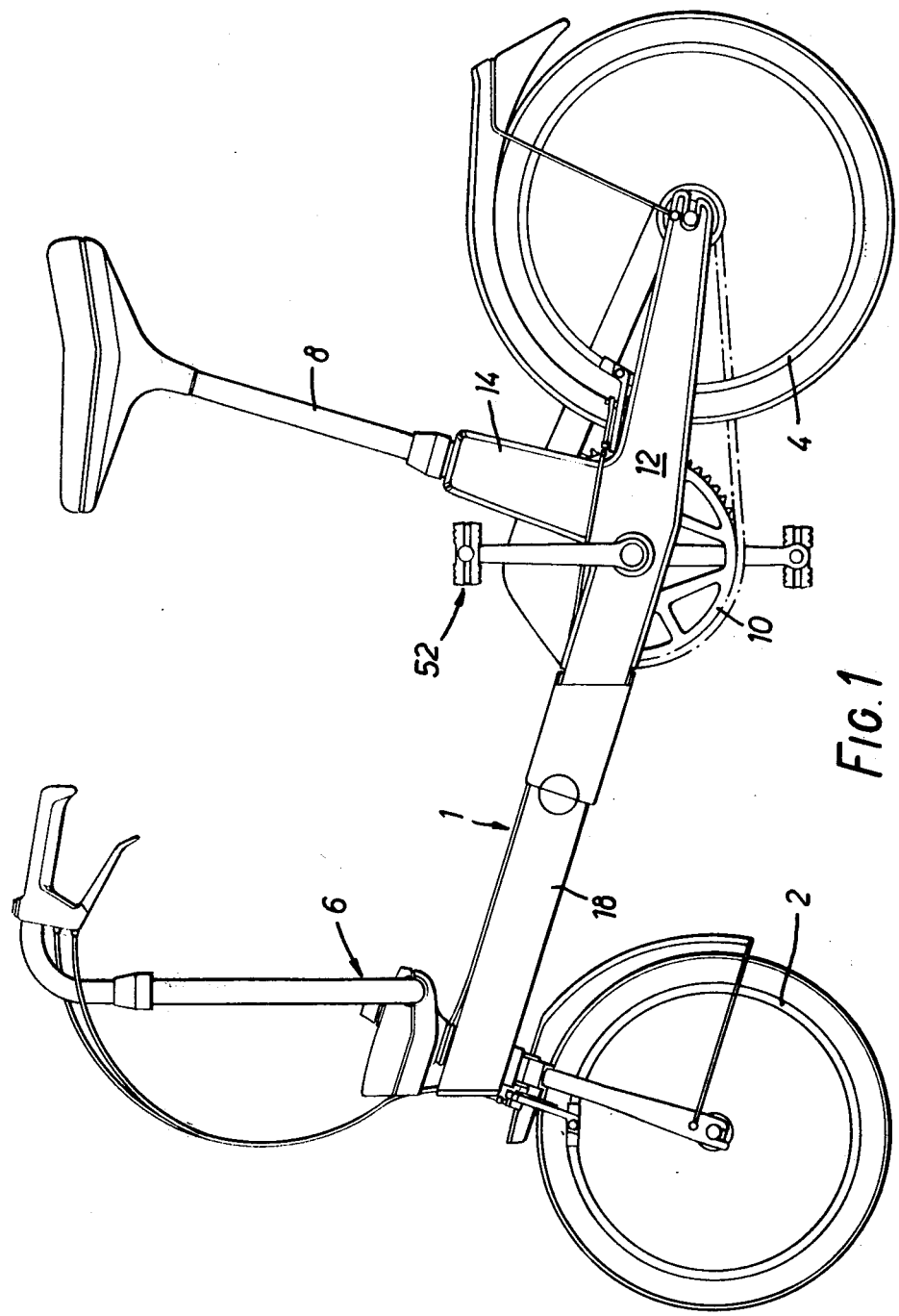

The bicycle shown in FIGS. 1 to 3 comprises basically a robust base frame member 1 from opposite ends of which a handlebar assembly 6 and a seat post 8 project upwardly, the frame member being hinged between its ends so as to be foldable (FIG. 3) about a vertically extending axis and carrying a pedal driven chain wheel assembly 10 between the ends of its rearward part 12. The seat post 8 fits telescopically into a seat tube 14 which is secured to the rear part 12 of the frame member 1 by an arrangement in accordance with the invention.

Figure 4:
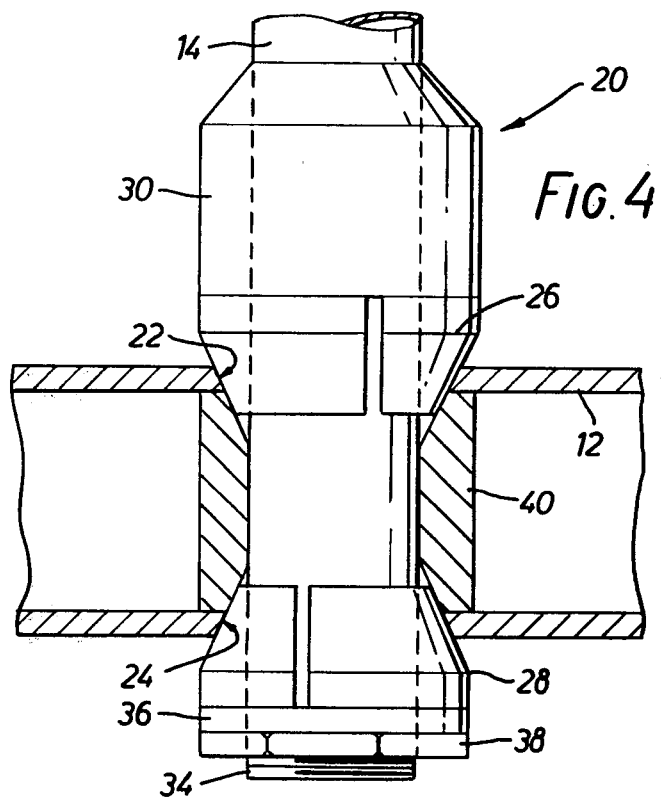
FIG. 4 is an enlarged detail of one of the securement arrangements employed in the bicycle of FIGS. 1 to 3.

The securement arrangement 20 by which the seat tube 14 is carried by the rear part 12 of the frame member 1 is described in more detail with reference to FIG. 4. The frame part 12 is a box section member apertured to receive the seat tube 14 by way of openings 22,24 in its upper and lower walls. Split collets 26,28 surround the seat tube 14 where it extends through the openings 22 and 24. Each collet is annular and is of part cylindrical and part frusto-conical shape, with the split extending axially so as to allow a reduction in the circumference of the collet on compression. The collets are arranged with their frusto-conical portions tapering towards the inside of the frame part 12. The surfaces defining the openings 22 and 24 are swaged or otherwise formed with a chamfer so as to match the frusto-conical portions of the collets. The seat tube 14 has a tube 30 secured externally thereto, conveniently by resin bonding above the frame part 12. The abutment between the tube 30 and the collet 26 ensures that the seat tube 14 cannot drop through the aperture in the frame part 12 during assembly. Underneath the frame part 12, the seat tube 14 projects outwardly through the opening 24 to terminate in a screw-threaded portion 34 on which is received a spacer or washer 36 and a nut 38.

On tightening of the nut 38, the two collets are urged together into their respective openings between the nut and the abutment provided by the lower end of the tube 30. The collets are thus peripherally compressed so as to clamp firmly onto the seat tube 14, the compression taking up the gap in each collet. A secure connection is thus obtained between the seat tube 14 and the transversely disposed box-section part 12.

Since the urging together of the collets 26 and 28 tends to deform the sidewalls of the frame part 12 in the region of the openings, these sidewalls may be reinforced as by the illustrated strengthening tube 40 which is secured within the frame part 12 around the seat tube 14. The strengthening tube 40 is chamfered at each end, or has its ends deformed so as to open out, in conformity with the frusto-conical surfaces of the collets 26 and 28.

Figure 5:
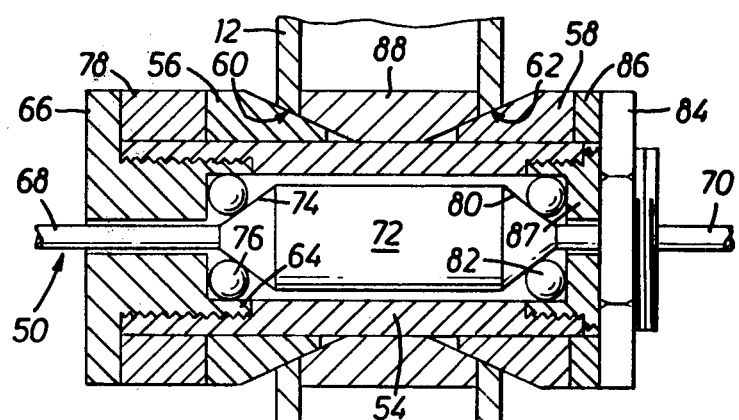
FIG. 5 shows an enlarged detail of a further securement arrangement including a bearing assembly employed in the bicycle of FIGS. 1 to 3.

A similar securement arrangement is employed in the illustrated bicycle to ensure satisfactory attachment of a bearing sleeve 54 for a shaft 50 of the bicycle's pedal assembly 52. This arrangement will now be described with reference to FIG. 5.

A tubular bearing sleeve 54 extends through an aperture in the frame part 12, being spaced therefrom by split collets 56 and 58 in respective openings 60,62. At one of its ends, the sleeve 54 is internally screw-threaded so as to receive the externally threaded stem 64 of a cup-shaped bearing member 66. The shaft 50 comprises two end parts 68,70 and an intermediate part 72 of increased diameter. A shoulder 74 between the parts 68 and 72 of the shaft retains balls 76 of one part of the bearing against the inner surface of the member 66. The member 66 is screwed into the bearing sleeve 54 until its outer circumference abuts a spacer 78 that engages the outer surface of the collet 56.

On the other side of the frame part 12, a further shoulder 80 between the end part 70 and enlarged diameter portion 72 of the shaft 50 retains balls 82 of the other part of the bearing against the inner surface of a cup-shaped bearing member 87, similar to the member 66, which is screwed into the bearing sleeve 54 at this end.

The bearing sleeve 54 is retained within the aperture of the frame part 12 by a nut 84 that engages a screw thread on the outside of the bearing member 87 and urges a washer 86 into engagement with the outer surface of the collet 58. Thus, tightening of the nut 84 on the bearing member 87 acts to urge the collets 56 and 58 towards each other, to effect the securement of the bearing sleeve 54 to the frame part 12 in the manner described with reference to FIG. 4. A strengthening tube 88 may be provided within the box frame section 12.

The invention can be embodied in a variety of arrangements other than those specifically described and is not limited to the securement of members in bicycles. However embodied, it will be seen to provide a reliable and convenient means for securing two members together, in which concentration of stress on the members both in making the securement, and under load, is minimized.

I claim:

1. A hollow tubular frame member of a bicycle, said frame member having opposed aligned apertures therethrough of a diameter substantially less than the thickness of the frame member, an elongated bearing sleeve that extends transversely through said frame member apertures and projects from opposing sides thereof, a pair of wedging elements disposed around said sleeve and extending inwardly of said frame member into respective ones of said apertures, means forming an abutment on said sleeve in abutment with one of said wedging elements, a screw thread on said sleeve, and a cooperatively threaded member received by said screw thread for applying pressure to the other of said wedging elements, whereby tightening of said cooperatively threaded member on said screw thread urges said wedging elements into said respective apertures to secure said bearing sleeve in said tubular frame member, the frame member and sleeve being perpendicular to each other at the point of juncture between them.

2. An arrangement according to claim 1, further comprising reinforcement means extending within said hollow frame member between said apertures and around said bearing sleeve.

3. An arrangement according to claim 1, in which each of said wedging elements comprises a split collet.

4. An arrangement according to claim 1, in which said frame member extends a substantial distance on opposite sides of said bearing sleeve.

* * * * *